(12) United States Patent
Tani

(10) Patent No.: US 9,596,373 B2
(45) Date of Patent: *Mar. 14, 2017

(54) IMAGE PROCESSING APPARATUS, AND REMOTE OPERATION SYSTEM FOR IMAGE PROCESSING APPARATUS

(71) Applicant: Sharp Kabushiki Kaisha, Osaka-shi, Osaka (JP)

(72) Inventor: Takeshi Tani, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/081,099

(22) Filed: Mar. 25, 2016

(65) Prior Publication Data

US 2016/0212290 A1    Jul. 21, 2016

Related U.S. Application Data

(63) Continuation of application No. 14/561,316, filed on Dec. 5, 2014, now Pat. No. 9,325,873.

(30) Foreign Application Priority Data

Dec. 24, 2013  (JP) .................. 2013-265700

(51) Int. Cl.
  *H04N 1/00* (2006.01)
  *H04N 1/32* (2006.01)
(52) U.S. Cl.
  CPC ..... *H04N 1/00973* (2013.01); *H04N 1/00307* (2013.01); *H04N 1/00411* (2013.01);
  (Continued)

(58) Field of Classification Search
  USPC ......................................................... 358/1.14
  See application file for complete search history.

(56) References Cited

U.S. PATENT DOCUMENTS

2008/0186536 A1    8/2008  Shimizu
2012/0075663 A1 *  3/2012  Lum .................. H04N 1/00225
                                                       358/1.15
(Continued)

FOREIGN PATENT DOCUMENTS

JP    2008-109483 A    5/2008
JP    2011-103572 A    5/2011
(Continued)

*Primary Examiner* — Ngon Nguyen
(74) *Attorney, Agent, or Firm* — Birch, Stewart, Kolasch & Birch, LLP

(57) ABSTRACT

An image processing apparatus is configured to be capable of being remotely operated by a terminal device via a wireless communication line. The image processing apparatus is equipped with a body control unit, a LAN interface, and a body operation unit. The body operation unit is capable of displaying a plurality of operation keys and capable of receiving a touch operation with respect to each of the plurality of operation keys. The LAN interface is used in order to acquire a positional relationship between the terminal device and the image processing apparatus. The body control unit, when determining that the terminal device is located close to the image processing apparatus, disables a touch operation with respect to a specific operation key among the plurality of operation keys on the body operation unit.

14 Claims, 8 Drawing Sheets

(52) U.S. Cl.
CPC ..... *H04N 1/00413* (2013.01); *H04N 1/00493* (2013.01); *H04N 1/32662* (2013.01); *H04N 2201/0055* (2013.01); *H04N 2201/0075* (2013.01); *H04N 2201/0094* (2013.01)

(56) References Cited

U.S. PATENT DOCUMENTS

| | | | | |
|---|---|---|---|---|
| 2012/0249586 | A1* | 10/2012 | Wither | H04N 1/00323 345/633 |
| 2013/0106749 | A1* | 5/2013 | Hosono | H04N 1/00411 345/173 |
| 2013/0222840 | A1* | 8/2013 | Hosoda | H04N 1/00204 358/1.14 |
| 2013/0329253 | A1* | 12/2013 | Sasaki | H04N 1/0035 358/1.15 |
| 2014/0118784 | A1 | 5/2014 | Ichiyama et al. | |
| 2014/0168682 | A1 | 6/2014 | Muto | |
| 2015/0109438 | A1* | 4/2015 | Matsuda | H04N 5/76 348/143 |

FOREIGN PATENT DOCUMENTS

| | | |
|---|---|---|
| JP | 2013-985 A | 1/2013 |
| JP | 2013-183215 A | 9/2013 |

* cited by examiner

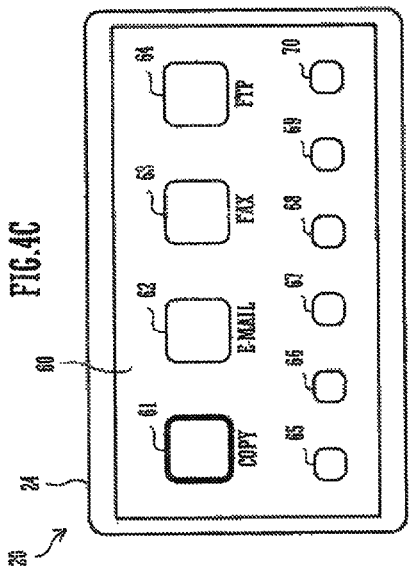
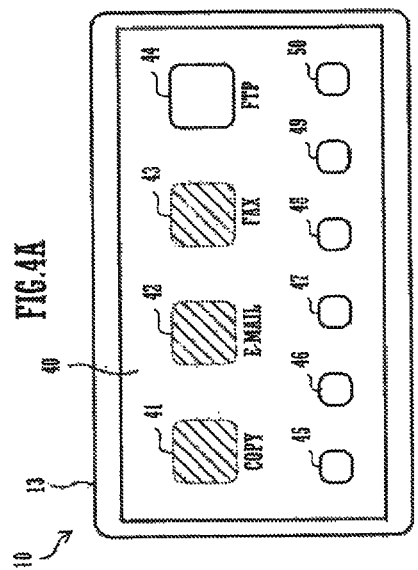
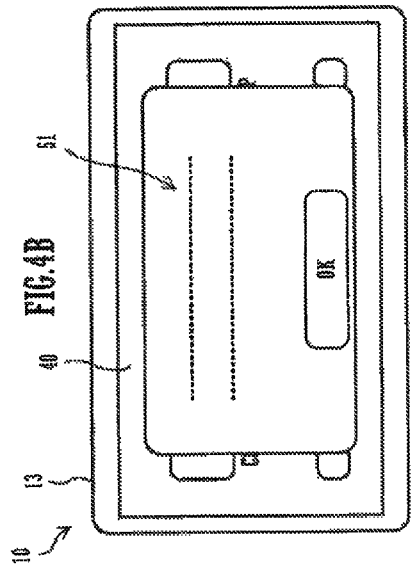

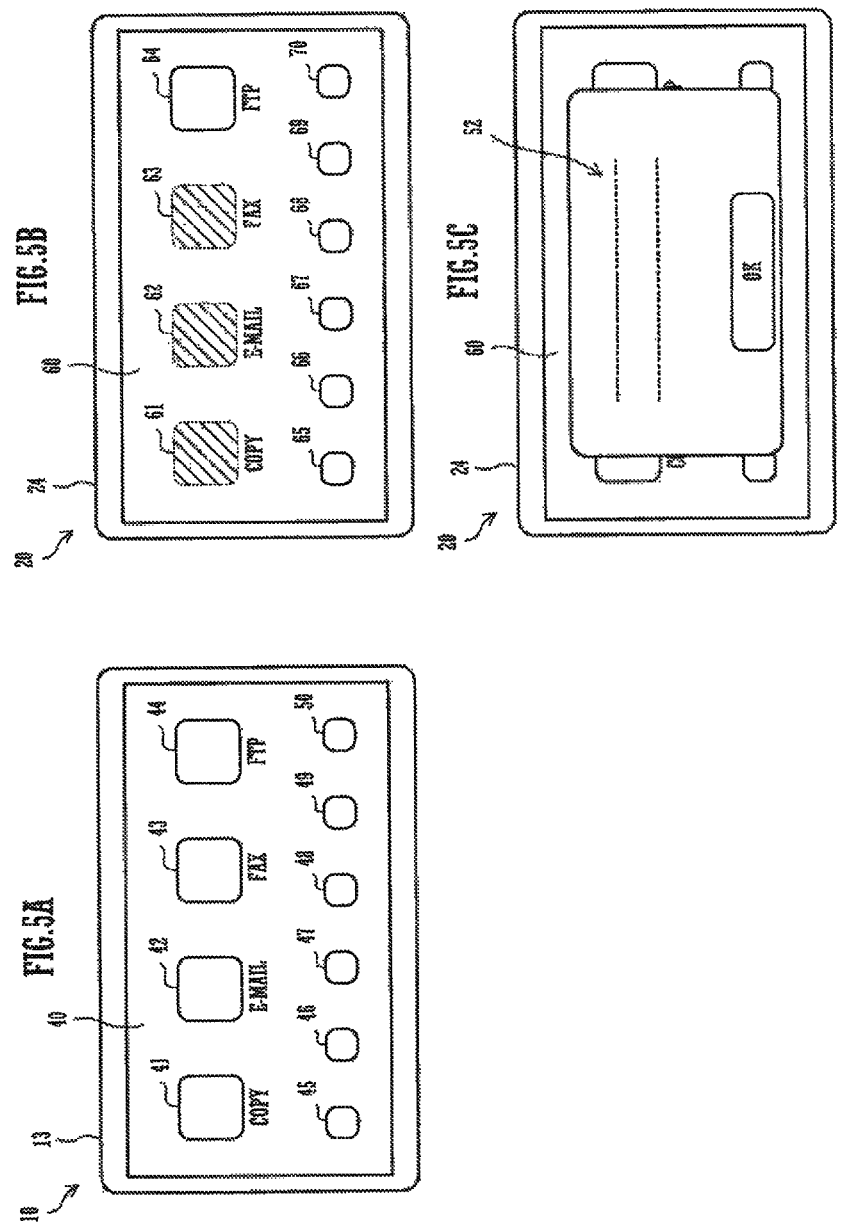

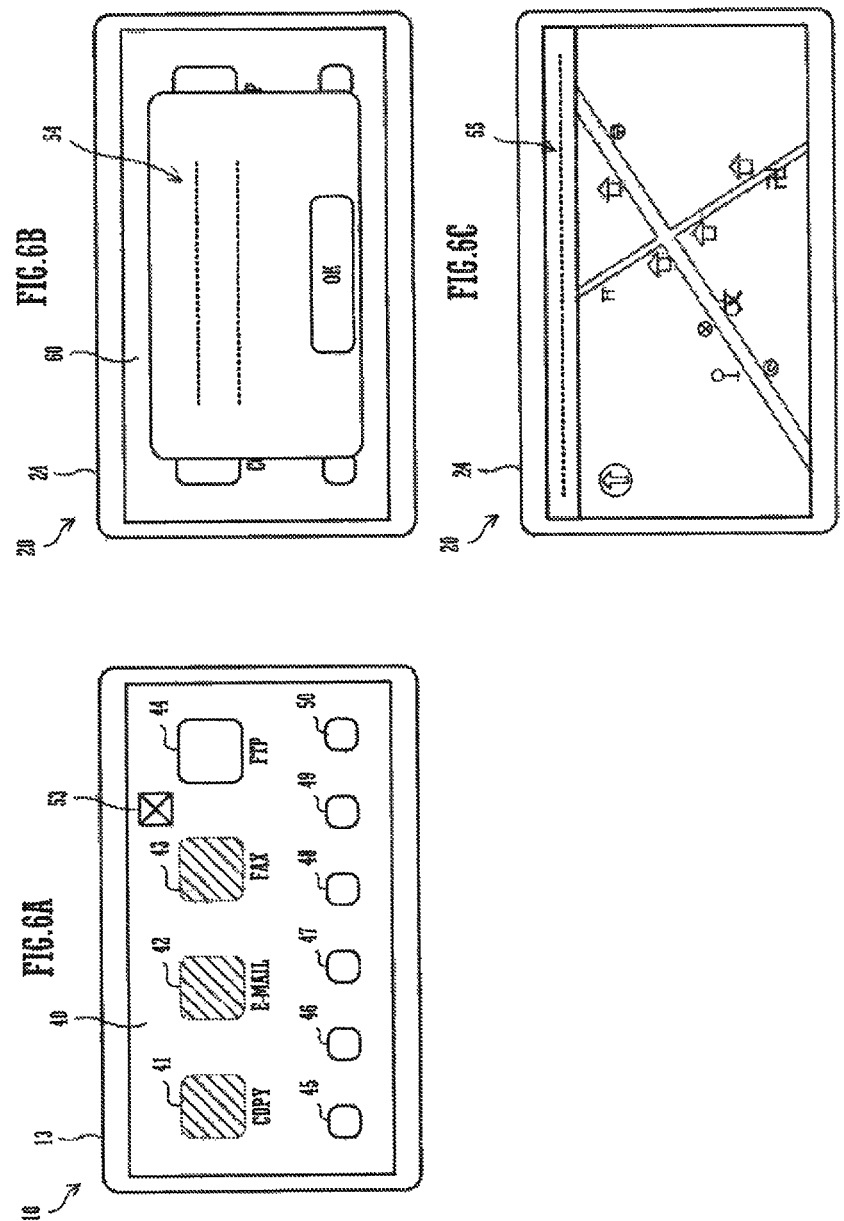

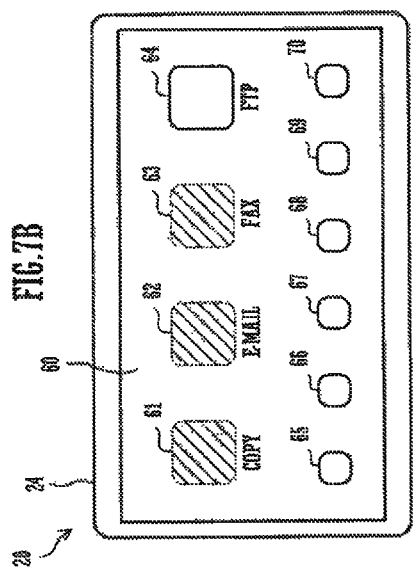
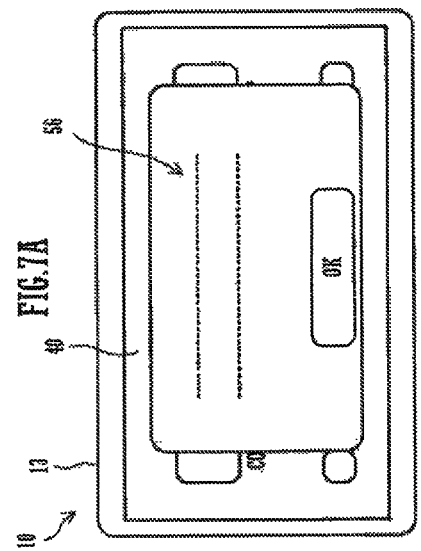

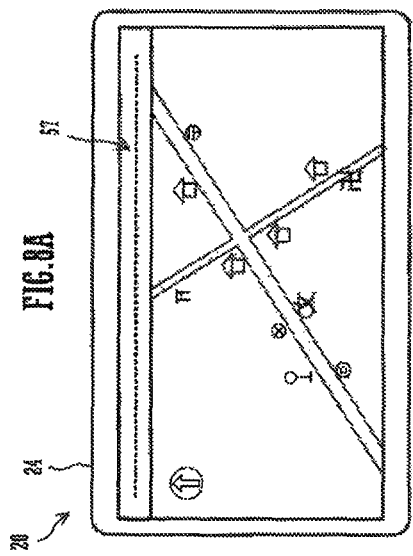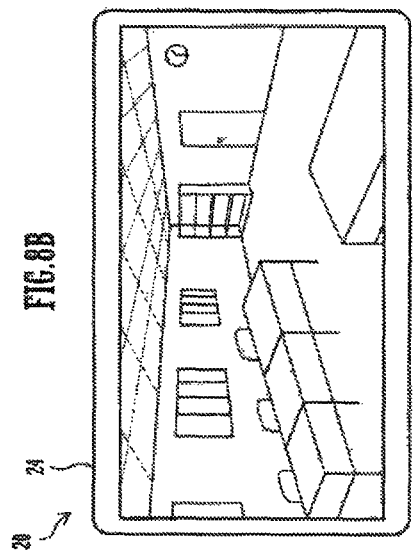

IMAGE PROCESSING APPARATUS, AND REMOTE OPERATION SYSTEM FOR IMAGE PROCESSING APPARATUS

CROSS REFERENCE

This application is a Continuation of copending application Ser. No. 14/561,316, filed on Dec. 5, 2014, which claims priority under 35 U.S.C. §119(a) on Patent Application No. 2013-265700 filed in Japan on Dec. 24, 2013, the entire contents of which are hereby incorporated by reference.

BACKGROUND OF THE INVENTION

The present invention relates to an image processing apparatus configured to be capable of being remotely operated by a terminal device via a wireless communication line, and to a remote operation system for such an image processing apparatus.

Of image processing apparatuses such as image forming devices and image reading devices, an image processing apparatus is configured to be capable of not only being operated by a body operation unit mounted in the image processing apparatus but also being remotely operated by a portable type terminal device such as a smartphone and a tablet terminal device, via a wireless communication line (see Japanese Patent Laid-Open publication No. 2011-103572, for example).

In image processing apparatuses, since operations that cause the image processing apparatuses to execute a specific action required for handling a document, such as copy start and scan start involve work of a user, including placement of a document, such operations are generally performed when the user is close to the image processing apparatus.

In view of the foregoing, an image processing apparatus has been proposed, the image processing apparatus being configured so as to disable a touch operation with respect to the specific operation key of the terminal device to cause the image processing apparatus to execute the above described specific action when the user is far from the image processing apparatus, (see Japanese Patent Laid-Open publication No. 2013-000985, for example). In this image processing apparatus, the user is not required to pay attention so as not to operate the specific operation key when being far from the image processing apparatus, which improves the operability of the terminal device.

However, in the conventional image processing apparatuses described in Japanese Patent Laid-Open publication No. 2011-103572 and Japanese Patent Laid-Open publication No. 2013-000985, the operation keys of the body operation unit of the image processing apparatus have not been switched between enabled and disabled, according to the positional relationship between the image processing apparatus and the terminal device.

Therefore, in a state in which there is a user who is operating the terminal device to cause the image processing apparatus to execute the above described specific action and there is another user who has operated the body operation unit to cause the image processing apparatus to execute the above described specific action, the user who is operating the terminal device gets confused due to a failure to cause the image processing apparatus to execute an action intended by the user, which may cause a risk of reducing the operability of the user who is operating the terminal device.

In the same manner, in a state in which there is a user who is operating the body operation unit to cause the image processing apparatus to execute the above described specific action and there is another user who has operated the terminal device to cause the image processing apparatus to execute the above described specific action, the user who is operating the body operation unit gets confused due to an unexpected behavior of the image processing apparatus, which may cause a risk of reducing the operability of the user who is operating the body operation unit.

An object of the present invention is to provide an image processing apparatus capable of improving operability even when a user who operates a terminal device and a user who operates a body operation unit exist at the same time, and to provide a remote operation system for such an image processing apparatus.

SUMMARY OF THE INVENTION

An image processing apparatus according to preferred embodiments of the present invention is configured to be capable of being remotely operated by a terminal device via a wireless communication line. The image processing apparatus is equipped with a body operation unit, a positional relationship acquisition unit, and a control unit. The body operation unit is capable of displaying a plurality of operation keys and capable of receiving a touch operation with respect to each of the plurality of operation keys. The positional relationship acquisition unit is used in order to acquire a positional relationship between the terminal device and the image processing apparatus. The control unit is configured so as to acquire the positional relationship between the terminal device and the image processing apparatus by using the positional relationship acquisition unit and, when determining that the terminal device is located close to the image processing apparatus, disable a touch operation with respect to a specific operation key among the plurality of operation keys on the body operation unit.

With this configuration, in a case in which the terminal device is located close to the image processing apparatus, the touch operation with respect to a specific operation key on the body operation unit is disabled, which can prevent the image processing apparatus from executing an action unintended by the user of the terminal device and can also improve the operability of the user of the terminal device. In addition, a user of the body operation unit, from the fact that the specific operation key is disabled, can recognize that the terminal device is located close to the image processing apparatus and the image processing apparatus is about to execute an action instructed by the user of the terminal device or is executing the action, so that the user of the body operation unit can be prevented from getting confused. According to the present invention, operability can be improved even when a user who operates a terminal device and a user who operates a body operation unit exist at the same time.

A remote operation system for an image processing apparatus according to preferred embodiments of the present invention is equipped with a terminal device and an image processing apparatus configured to be capable of being remotely operated by the terminal device via a wireless communication line. The image processing apparatus is equipped with a body operation unit, a first positional relationship acquisition unit, and a body control unit. The body operation unit is capable of displaying a plurality of operation keys and capable of receiving a touch operation with respect to each of the plurality of operation keys. The first positional relationship acquisition unit is used in order to acquire a positional relationship between the terminal device and the image processing apparatus. The body control unit is configured so as acquire the positional relationship between the terminal device and the image processing apparatus by using the first positional relationship acquisition unit, and, when determining that the terminal device is located close to the image processing apparatus, disable a touch operation with respect to a specific operation key among the plurality of operation keys on the body operation unit.

With this configuration, in a case in which the terminal device is located close to the image processing apparatus, the touch operation with respect to the specific operation key on the body operation unit is disabled, which can prevent the image processing apparatus from executing an action unintended by a user of the terminal device and can also improve the operability of the user of the terminal device. In addition, a user of the body operation unit, from the fact that the specific operation key is disabled, can recognize that the terminal device is located close to the image processing apparatus and the image processing apparatus executes an action instructed by the user of the terminal device, so that the user of the body operation unit can be prevented from getting confused. According to the present invention, operability can be improved even when a user who operates a terminal device and a user who operates a body operation unit exist at the same time.

The foregoing and other features and attendant advantages of the present invention will become more apparent from the reading of the following detailed description of the invention in conjunction with the accompanying drawings.

BRIEF DESCRIPTION OF THE DRAWINGS

FIG. 4A to FIG. 4C are views showing exemplary displays of operation units in a case in which the terminal device is located close to the image processing apparatus: FIG. 4A shows an exemplary display of a body operation unit equipped in the image processing apparatus, FIG. 4B shows an exemplary display when a disabled operation key of the body operation unit is operated, and FIG. 4C shows an exemplary display of a terminal operation unit equipped in the terminal device.

FIG. 5A to FIG. 5C are views showing exemplary displays of operation units in a case in which the terminal device is located far from the image processing apparatus: FIG. 5A shows an exemplary display of the body operation unit, FIG. 5B shows an exemplary display of the terminal operation unit, and FIG. 5C shows an exemplary display when a disabled operation of the terminal operation unit is operated.

FIG. 6A to FIG. 6C are views showing exemplary displays of an error message on operation units in a case in which the terminal device is located close to the image processing apparatus, in a remote operation system including an image processing apparatus according to a second preferred embodiment of the present invention: FIG. 6A shows an exemplary display of a body operation unit, FIG. 6B shows an exemplary display of a terminal operation unit, and FIG. 6C shows an exemplary display of an error message when application software other than application software for remote operation of the image processing apparatus is being operated in the terminal device.

FIG. 7A and FIG. 7B are views showing exemplary displays of an error message on operation units in a case in which the terminal device is located far from the image processing apparatus, in the emote operation system including the image processing apparatus according to the second preferred embodiment of the present invention: FIG. 7A shows an exemplary display of the body operation unit, and FIG. 7B shows an exemplary display of the terminal operation unit.

FIG. 8A and FIG. 8B are views showing exemplary displays in a terminal operation unit of a terminal device located fax from an image processing apparatus, in a remote operation system including the image processing apparatus according to a third preferred embodiment of the present invention: FIG. 8A shows an exemplary display of a message indicating that a video captured by a camera can be displayed, and FIG. 8B shows an exemplary display of the video captured by the camera.

DETAILED DESCRIPTION OF THE INVENTION

Figure 1:
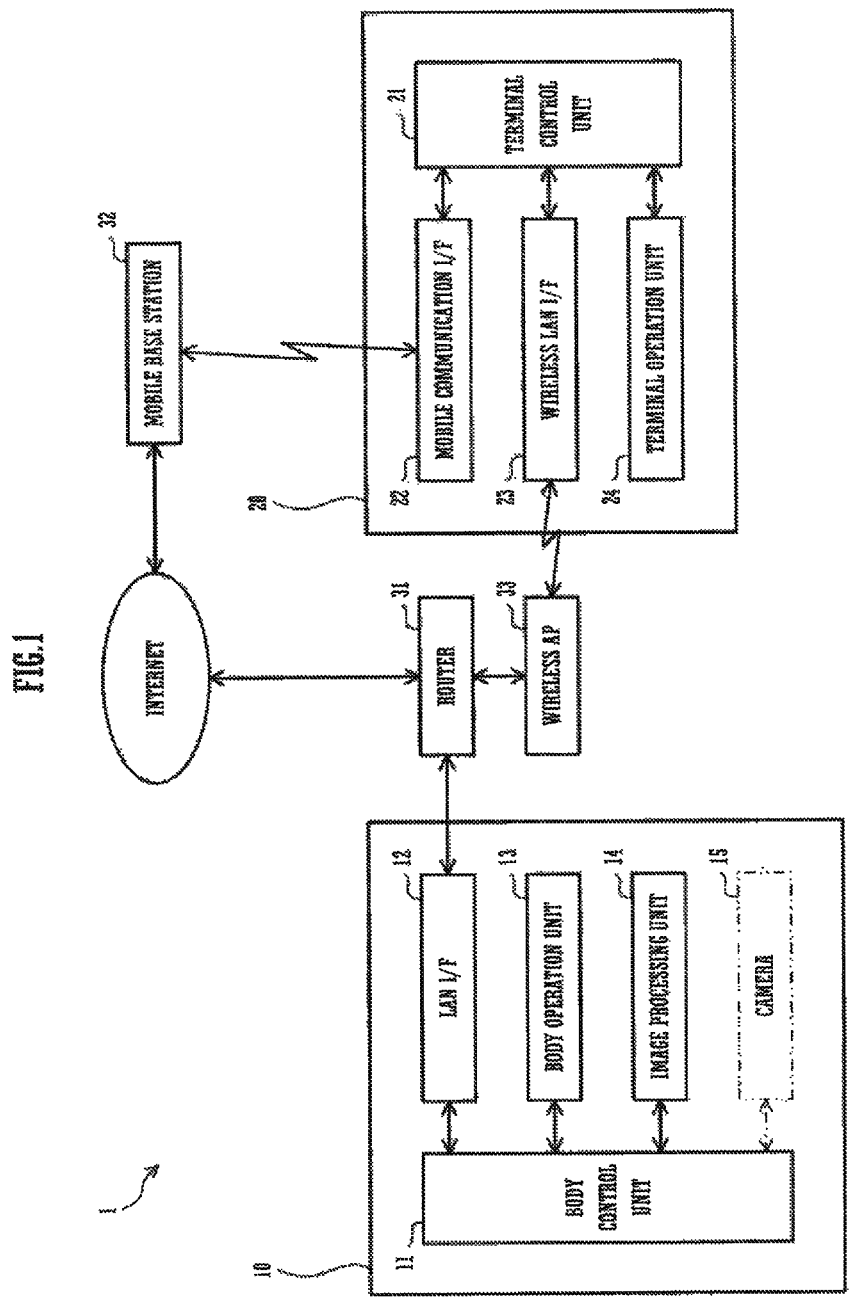
FIG. 1 is a block diagram showing a schematic configuration of a remote operation system including an image processing apparatus according to a first preferred embodiment of the present invention.

As shown in FIG. 1, a remote operation system 1 including an image processing apparatus 10 according to a first preferred embodiment of the present invention includes one or more terminal devices 20 in addition to the image processing apparatus 10. As an example, the image processing apparatus 10 is a multifunctional machine that has various functions, such as a printer function, a copy function, a facsimile function, and a Scan to E-Mail function. The terminal device 20 may be a portable type terminal device that has a wireless communication function, such as a smartphone and a tablet terminal device. In the terminal device 20, application software for remote operation of the image processing apparatus 10 is installed.

The image processing apparatus 10 is equipped with a body control unit 11, a Local Area Network (LAN) interface 12, a body operation unit 13, and an image processing unit 14.

The LAN interface 12 is connected to a router 31 arranged near the image processing apparatus 10, and enables Internet connection via the router 31. As an example, the router 31 and the image processing, apparatus 10 are arranged in the same room.

The body operation unit 13 is capable of displaying various operation screens including a plurality of operation keys and receives an input operation, that is, a touch operation of a user, with respect to each of the plurality of operation keys. For example, as the body operation unit 13, a liquid crystal touch panel is used.

The image processing unit 14 includes an image reading unit that reads an image of a document and generates image data, and an image forming unit that forms an image on a sheet of paper based on the image data. While, as an example, the image forming unit 14 executes an electrophotographic image forming process, the image forming unit 14 may be made to execute other image forming processes such as an inkjet process.

The body control unit 11, when receiving an input of an action instruction from the terminal device 20 through the body operation unit 13 or the LAN interface 12, acts in accordance with the action instruction. For example, the body control unit 11 executes the copy function in which an image read from a document in the image processing unit 14 is copied onto a sheet of paper. The body control unit 11 is configured to control each unit of the image processing apparatus 10 in an integrated manner.

Thus, the image processing apparatus 10 is configured to be capable of being remotely operated by the terminal device 20 via a wireless communication line.

The terminal device 2 is equipped with a terminal control unit 21, a mobile communication interface 22, a wireless LAN interface 23, and a terminal operation emit 24.

The mobile communication interface 22 enables internet connection by a mobile communication line that is commonly called as 3G, 4G, LTE (Long Term Evolution), and the like, through a mobile base station 32. In other words, the mobile communication interface 22 is used for communication by the mobile communication line.

The wireless LAN interface 23 performs wireless communication with a wireless access point (hereinafter will be referred to as "wireless AP") 33, and further enables wireless communication with the body control unit 11 of the image processing apparatus 10 through the router 31 and the LAN interface 12. In other words, the wireless LAN interface 23 is used for communication by a wireless LAN line. It is to be noted that, in place of the router 31 and the wireless AP 33, a wireless LAN router in which both are integrated can be used.

The terminal operation unit 24 is capable of displaying various operation screens including a plurality of operation keys and receives an input operation, that is, a touch operation of a user, with respect to each of the plurality of operation keys. For example, as the terminal operation unit 24, a liquid crystal touch panel is used.

The terminal control unit 21, when receiving an input of an act on instruction from the terminal operation unit 24, acts in accordance with the action instruction. For example in a state in which the application software for remote operation of the image processing apparatus 10 is activated, if an input operation for executing the copy function of the image processing apparatus 10 is performed, an action instruction for executing the copy function of the image processing apparatus 10 is transmitted to the image processing apparatus 10 via the mobile communication line or the wireless LAN line.

When the terminal device 20 is in a region in which both the wireless communication via the wireless AP 33 and the wireless communication via the mobile base station 32 can be performed, the wireless communication via the wireless AP 33 is preferentially used.

In the remote operation system 1, in a case in which the terminal device 20 performs wireless communication with the image processing apparatus 10 via the wireless AP 33, the router 31 assigns an IP address to the terminal device 20. The image processing apparatus 10, when a network address derived from the IP address of the terminal device 20 serving as a communication destination is the same as a network address of the network to which the image processing apparatus 10 belong, can determine that the terminal device 20 serving as the communication destination belongs to the same network as the image processing apparatus 10, that is, the wireless communication is wireless communication via the wireless AP 33. Similarly, also in the terminal device 20, since the network address is the same as the network address of the image processing apparatus 10, the wireless communication is determined as wireless communication via the wireless AP 33.

On the other hand, in a case in which the terminal device 20 performs wireless communication with the image processing apparatus 10 via the mobile base station 32, the mobile base station 32 assigns an IP address to the terminal device 20. Therefore, since a network address derived from the IP address of the terminal device 20 serving as a communication destination is different from a network address of the network to which the image processing apparatus 10 belong, both the image processing apparatus 10 and the terminal device 20 determine that the wireless communication between the image processing apparatus 10 and the terminal device 20 is wireless communication via the mobile base station 32.

In a case in which a type of the wireless communication line between the image processing apparatus 10 and the terminal device 20 is a wireless LAN line, the terminal device 20 exists in a predetermined region in which communication by the wireless LAN line can be performed with the wireless AP 33 arranged near the image processing apparatus 10, so that the terminal device 20 can be determined to be located close to the image processing apparatus 10. On the other hand, in a case in which a type of the wireless communication line between the image processing apparatus 10 and the terminal device 20 is a mobile communication line, the terminal device 20 is more unlikely to exist in the predetermined region in which communication by the wireless LAN line can be performed, so that the terminal device 20 can be determined to be located far from the image processing apparatus 10. Thus, the determination by a type of a wireless communication line as to whether the terminal device 20 is close to or far from the image processing apparatus 10 can simplify a process and equipment for determination. It should be noted that the LAN interface 12, the mobile communication interface 22, and the fireless LAN interface 23 are equivalent to a positional relationship acquisition unit that is used in order to acquire a positional relationship between the image processing apparatus 10 and the terminal device 20.

Figure 2:
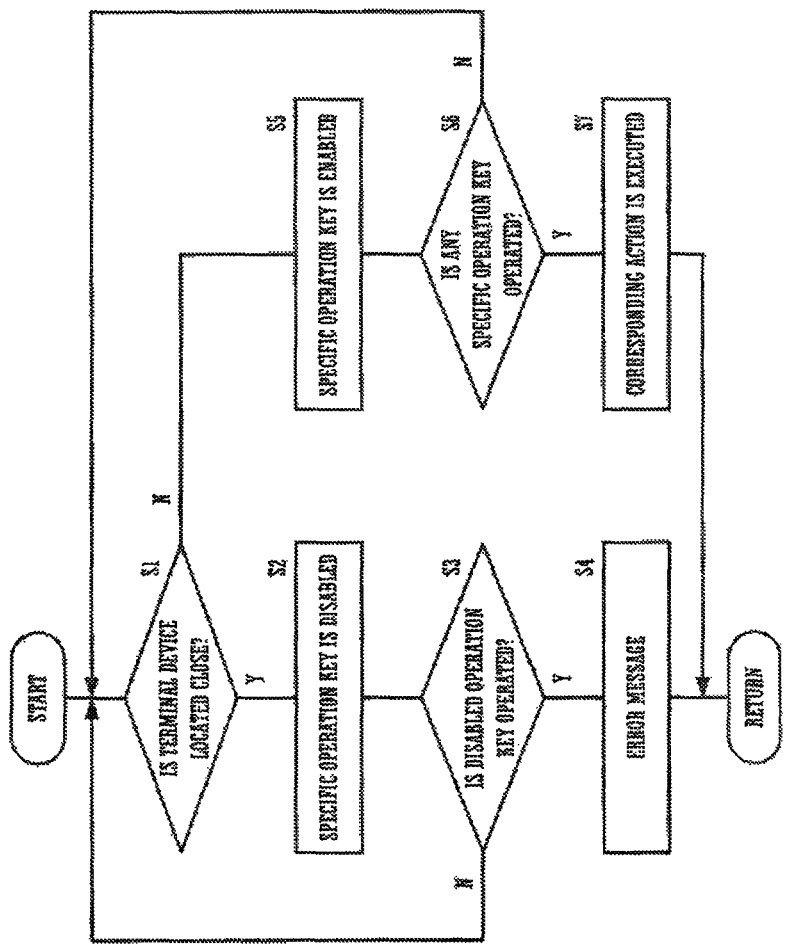
FIG. 2 is a flow chart showing process steps in the image processing apparatus.
Figure 3:
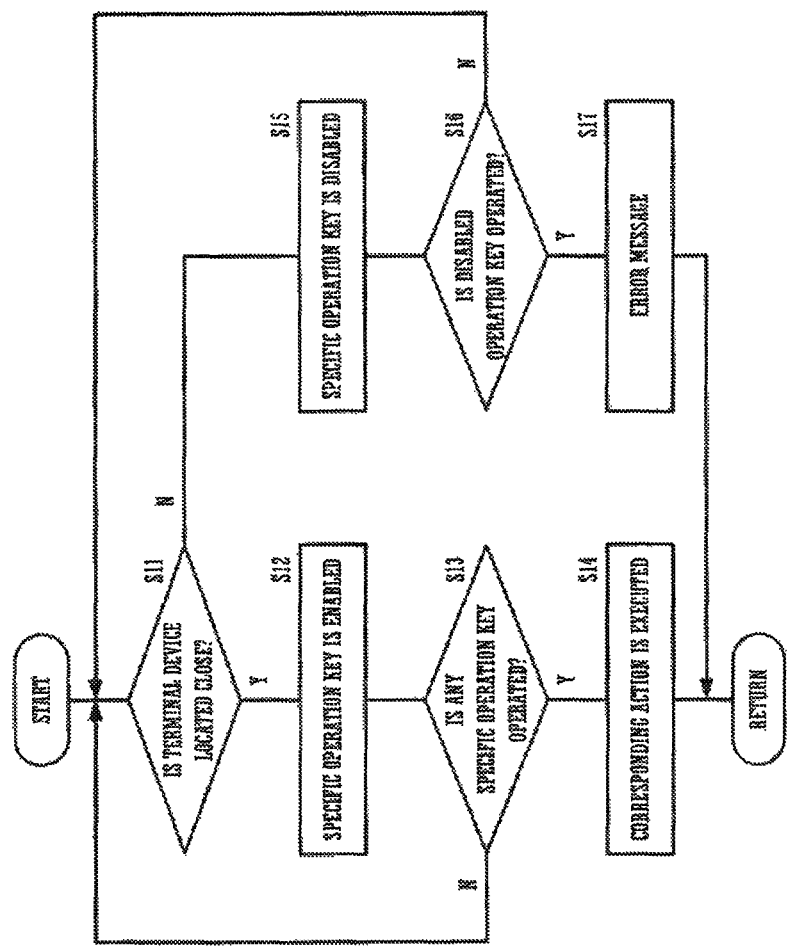
FIG. 3 is a flow chart showing process steps in as terminal device.

FIG. 2 shows an example of the process steps in the body control unit 11 of the image processing apparatus 10, and FIG. 3 shows an example of the process steps in the terminal control unit 21 of the terminal device 20.

In the image processing apparatus 10, the body control unit 11 determines whether or not the terminal device 20 that activates the application software for remote operation of the image processing apparatus 10 and is about to remotely operate the image processing apparatus 10 is located close to the image processing apparatus 10 (S1). Similarly, also in the terminal device 20 that activates the application software for remote operation of the image processing apparatus 10 and is about to remotely operate the image processing apparatus 10, the terminal control unit 21 determines whether or not the terminal device 20 itself is located close to the image processing apparatus 10 (S11). It is to be noted that it is possible to configure so that the determination as to whether or not the terminal device 20 that activates the application software for remote operation of the image processing apparatus 10 and is about to remotely operate the image processing apparatus 10 is located close to the image processing apparatus 10 is performed by one of the image processing apparatus 10 or the terminal device 20 and a determination result is transmitted to the other.

In the image processing apparatus 10, in a case in which the terminal device 20 is located close, specific operation keys 41 to 43 among a plurality of operation keys 41, 42, 43, 44, 45, 46, 47, 48, 49, and 50 that are displayed on an operation screen 40 of the body operation unit 13 are grayed out and displayed, for example, as shown in FIG. 4A, and the touch operation with respect to these specific operation keys 41 to 43 is disabled (S2). If these disabled specific operation keys 41 to 43 are touch operated (S3), as shown in FIG. 4B, an error message 51 is displayed (S4). The error message 51 at this time is displayed as, for example, "Due to the ongoing operation from the mobile terminal, the operation from the main body cannot be executed."

The specific operation keys 41 to 43 may preferably be operation keys that receive an operation for causing the image processing apparatus 10 to execute an action required for handling a document by a user. For example, the specific operation keys 41 to 43 may include a copy key 41 for executing the copy function, an E-Mail key 42 for executing the SCAN to E-Mail function, and a facsimile key 43 for executing the facsimile function.

In the terminal device 20, the activation of the application software for remote operation makes it possible to display an operation screen 60 similar to the operation screen 40 displayed on the body operation unit 13. The operation key 41 on the body operation unit 13 and the operation key 61 in the terminal operation unit 24 are operation keys to which the functions equal to each other are assigned. Similarly, the operation keys 42, 43, 44, 45, 46, 47, 48, 49, and 50 on the body operation unit 13 and the operation keys 62, 63, 64, 65, 66, 67, 68, 69, and 70 in the terminal operation unit 24 are operation keys to which the functions equal to each other are assigned, respectively.

In the terminal device 20, in the case in which the terminal device 20 is located close, a touch operation with respect to the specific operation keys 61 to 63 is enabled (S12), and, if any of the specific operation keys 61 to 63 is touch operated (S13), an action assigned to the operation key that has been touch operated is executed (S14). In such a case, as shown in FIG. 4C, on the operation screen 60 of the terminal operation unit 24, the operation key 61, which is the most frequently used among the specific operation keys 61 to 63, may be made to flash more than the other operation keys, for example, and can be made distinct from the other operation keys.

In the case in which the terminal device 20 is located close to the image processing apparatus 10, a touch operation with respect to the specific operation keys 41 to 43 on the body operation unit 13 is disabled, which can prevent the image processing apparatus 10 from executing an action unintended by a user of the terminal operation unit 24 and can also improve the operability of the user of the terminal operation unit 24. In addition, a user of the body operation unit 13, from the fact that the specific operation keys 41 to 43 are disabled, can recognize that the terminal device 20 is located close to the image processing apparatus 10 and the image processing apparatus 10 is about to execute an action instructed by the user of the terminal operation unit 24 or is executing the action, so that the user of the body operation unit 13 can be prevented from getting confused. Thus, the present can improve operability even when a user who operates the terminal operation unit 24 and a user who operates the body operation unit 13 exist at the same time.

Subsequently, a description is directed to a case in which the terminal device 20 that activates the application software for remote operation of the image processing apparatus 10 and is about to remotely operate the image processing apparatus 10 is located far from the image processing apparatus 10.

In the image processing apparatus 10, in a case in which the terminal device 20 is located far (No in S1), as shown in FIG. 5A, a touch operation with respect to the specific operation keys 41 to 43 is enabled (S5), and, if any of the specific keys 41 to 43 is touch operated (S6), an action assigned to the operation key that has been operated is executed (S7).

On the other hand, in the terminal device 20, in a case in which the terminal device 20 is located far from the image processing apparatus 10 (No in S11), the specific operation keys 61 to 63, as shown in FIG. 5B, for example, are grayed out and displayed, and a touch operation with respect to these specific operation keys 61 to 63 is disabled (S15). If these disabled specific operation keys 61 to 63 are touch operated (S16), as shown in FIG. 5C, an error message 52 is displayed (S17). The error message 52 at this time is displayed as, for example, "Due to the necessity of reading a document, the operation cannot be executed from a remote place."

In the case in which the terminal device 20 is located far from the image processing apparatus 10, the operation for causing the image processing apparatus 10 to execute a specific action required for handling a document by a user is not generally performed in the terminal operation unit 24. Therefore, even if the specific operation keys 41 to 43 on the body operation unit 13 become enabled, a possibility that the operation from the body operation unit 13 and the operation from the terminal operation unit 24 conflict is very low. Accordingly, the operability of the user of the terminal operation unit 24 and the user of the body operation unit 13 is not lowered. On the other hand, in the case in which the terminal device 20 is located close to the image processing apparatus 10, a possibility that the user of the terminal operation unit 24 performs an operation for causing the image processing apparatus 10 to execute the above described specific action is high, so that disabling the touch operation with respect to the specific operation keys 41 to 43 on the body operation unit 13 can improve the operability of the user of the terminal operation unit 24 and the user of the body operation unit 13.

Moreover, in the case in which the terminal device 20 is located far from the image processing apparatus 10, disabling the touch operation with respect to the specific operation keys 61 to 63 in the terminal operation unit 24 can prevent the image processing apparatus 10 from executing an action unintended by a user of the body operation unit 13, can prevent the user of the body operation unit 13 from getting confused, and can also improve the operability of the user of the body operation unit 13. Furthermore, the user of the terminal operation unit 24 can be suppressed by the disabled specific operation keys 61 to 63 from causing an incorrect operation and can be released from the need to pay too much attention to an input operation, which can improve the operability of the user of terminal operation unit 24.

A remote operation system 1 including the image processing apparatus 10 according to a second preferred embodiment of the present invention is configured in the same manner as the remote operation system 1 including the image processing apparatus 10 according to the first preferred embodiment of the present invention, except for changing a method of displaying an error message of the error that requires maintenance of the image processing apparatus 10 based on the positional relationship between the image processing apparatus 10 and the terminal device 20.

The error that requires maintenance of the image processing apparatus 10 includes: out of paper, a paper jam, toner low, fully stacked sheets of paper on a paper output tray, and a document forgotten to be taken from a document platen.

In the image processing apparatus 10, in the case in which the terminal device 20 that activates the application software for remote operation of the image processing apparatus 10 and is about to remotely operate the image processing apparatus 10 is located close to the image processing apparatus 10, as compared with an error message in the case in which the terminal device 20 is located far from the image processing apparatus 10, as shown in FIG. 6A, an error message 53 may preferably be displayed in a smaller size on the body operation unit 13. For example, the error message 53 is displayed as a specific icon at the end of the operation screen 40.

In the terminal device 20, when being located close to the image processing apparatus 10, as shown in FIG. 6B, the terminal operation unit 24 displays an error message 54 in a large size. The error message 54 at this time is displayed as, for example, "No A4 paper is in Tray 3. Load A4 paper in Tray 3."

Additionally, in the terminal device 20, even when being located close to the image processing apparatus 10, as shown in FIG. 6C, in a case in which application software other than application software for remote operation of the image processing apparatus 10 is being operated, the application software for remote operation of the image processing apparatus 10 runs in the background, and the terminal operation unit 24 displays an error message 55 in a comparatively small size. For example, the error message 55 is displayed in one line in the lateral direction at the upper end of the operation screen 60. The error message 55 is displayed as, for example, "Load A4 paper in Tray 3 of the nearby image processing apparatus MFP-XXX (model number)."

On the other hand, in the image processing apparatus 10, in the case in which the terminal device 20 is located far from the image processing apparatus 10, as compared with an error message in the case in which the terminal device 20 is located close to the image so processing apparatus 10, as shown in FIG. 7A, an error message 56 may preferably be displayed in a larger size on the body operation unit 13. The error message 56 at this time is displayed as, for example, "No A4 paper is in Tray 3. Load A4 paper in Tray 3."

In the terminal device 20, in the case in which the terminal device 20 is located far from the image processing, apparatus 10, as shown in FIG. 7B, the error message of the error that requires manual maintenance of the image processing apparatus 10 is not displayed.

Thus, according to the positional relationship between the image processing apparatus 10 and the terminal device 20, the specific operation keys 41 to 43 of the body operation unit 1 and the specific operation keys 61 to 63 of the terminal operation unit 24 are, switched between enabled and disabled. This switches a user who can operate the image processing apparatus 10 between the user of the body operation unit 13 and the user of the terminal operation unit 24. Therefore, an error message is displayed so as to be more noticeable to a user having a high need of the error message and so as not to obstruct other displays, to a user having a low need of the error message. This makes it possible to easily convey the error message to the user having a high need of the error message, and to improve the operability of operations other than the specific operation keys 41 to 43 for the user having a low need of the error message.

Specifically, in the case in which the terminal device 20 is located close to the image processing apparatus 10, since the specific operation keys 41 to 43 on the body operation unit 13 are disabled and the of the terminal operation unit 24 eventually operates the image processing apparatus 10, the user of the terminal operation unit 24 may be suitable for handling errors including: out of paper, out of toner, a paper jam, and a document jam. Therefore, the user of the terminal operation unit 24 has a higher need of an error message. Accordingly, as compared with an error message displayed on the body operation unit 13, an error message is displayed in a larger size on the terminal operation unit 24. On the other hand, since the user of the body operation unit 13 has a lower need of such an error message, the error message is displayed in a small size, which improves the operability of the body operation unit 13.

An image processing apparatus 10 according to a third preferred embodiment of present invention is configured in the same manner as the image processing apparatus 10 according to the first preferred embodiment of the present invention, except for further including a camera 15 (see FIG. 1) as a capturing device and being configured so that captured data obtained by the camera 15 is transmitted to the terminal device 20 in the case in which the terminal device 20 in which the application software for remote operation of the image processing apparatus 10 is installed is located far from the image processing apparatus 10. The captured data may be image data or video data.

In the image processing apparatus 10 according to the third preferred embodiment of the present invention, the peripheral surroundings of the image processing apparatus 10 is captured by the camera 15, and captured data obtained by the camera 15 is transmitted only to the terminal device 20 located far from the image processing apparatus 10. To the terminal device 20 located close to the image processing apparatus 10 and having a low need of such data the captured data is not transmitted.

In the terminal device 20, the operation screen 60 of the terminal operation unit 24 may preferably display a message 57 that an image or video captured by the camera 15 can be displayed. For example, the message 57 is displayed, at intervals of a first predetermined time period, for a second predetermined time period.

As shown in FIG. 8A, in the terminal device 20, in the case in which application software other than the application software for remote operation of the image processing apparatus 10 is being operated, the application software for remote operation of the image processing apparatus 10 runs in the background, and the terminal operation unit 24 displays an error message 57 in a comparatively small size. For example, the error message 57 is displayed in one line in the lateral direction at the upper end of the operation screen 60. The message 57 is displayed as, for example, "Capturing is in progress with the camera of the image processing apparatus MFP-XXX (model number). Touch here to check."

In the terminal device 20, if a predetermined spot is touch operated, as shown in FIG. 8B, an image or video captured by the camera 15 is displayed in the terminal operation unit 24. The terminal operation unit 24 may preferably display live feed. It should be noted that the image processing apparatus 10 may preferably further include a microphone, acquire audio data around the image processing apparatus 10, and transmit the audio data together with the captured data to the terminal device 20 located far from the image processing apparatus 10.

Since the user of the terminal device 20 located far from the image processing apparatus 10 can know the peripheral surroundings of the image processing apparatus 10 through an image or a video, security can be improved. Therefore, the crime prevention of the installation location of the image processing apparatus 10, such as an office, can be enhanced. In addition, captured data obtained by the camera 15 may preferably be configured to be recorded.

It is to be noted that the present invention can also be configured so that: the positional relationship acquisition unit that is used in order to acquire a positional relationship between the image processing apparatus 10 and the terminal device 20 may preferably include a GPS (Global Positioning System) or a three dimensional position sensor; the GPS or the three dimensional position sensor senses a distance between the image processing apparatus 10 and the terminal device 20; the image processing apparatus 10 and the terminal device 20 are determined to be located far from each other when the distance is equal to and more than a predetermined value; and the image processing apparatus 10 and the terminal device 20 are determined to be located close to each other when the distance is less than the predetermined value. Moreover, the present invention can also be configured so that whether the image processing apparatus 10 and the terminal device 20 are determined to be located far from or close to each other, with the antenna intensity of transmission and reception between both the image processing apparatus 10 and the terminal device 20.

The image processing apparatus 10 is not limited to being a multifunctional machine, and the present invention can also be applied to an image forming device such as a copying machine, a printer, a facsimile machine, and an image reading device such as a scanner, and, even if it is a case in which a user of the terminal device and a user of the body operation unit exist at the same time, the effect that operability can be improved can be achieved.

It is also conceivable that new preferred embodiments may be configured by combining respective technical features of the above described preferred embodiments one another.

The foregoing preferred embodiments are to be considered in all respects as illustrative and not restrictive. The scope of the present invention is defined by the following claims, not by the foregoing preferred embodiments. Further, the scope of the present invention is intended to include the scopes of the claims and all possible changes and modifications within the senses and scopes of equivalents.

What is claimed is:

1. An image processing apparatus configured to eliminate user confusion when the image processing apparatus is subject to control both locally by an operation unit and remotely by a terminal device via a wireless communication line, the image processing apparatus comprising:
    a display unit capable of displaying a message;
    a positional relationship acquisition unit used in order to acquire a positional relationship between the terminal device and the image processing apparatus; and
    a control unit configured so as to acquire the positional relationship between the terminal device and the image processing apparatus by using the positional relationship acquisition unit wherein when the control unit determines that the terminal device is located close to the image processing apparatus, the control unit disables at least some operation keys of the operation unit, and in response to a user operating at least one of disabled operation keys the control unit causes the display unit to display an error message.

2. The image processing apparatus according to claim 1, wherein when the control unit determines that the terminal device is located close to the image processing apparatus, the control unit causes the display unit to display a message smaller than a message displayed when determining that the terminal device is located far from the image processing apparatus.

3. The image processing apparatus according to claim 1, wherein the control unit determines that the terminal device is located close to the image processing apparatus when a wireless local area network line is used as the wireless communication line, and the control unit determines that the terminal device is located far from the image processing apparatus when a mobile communication line is used as the wireless communication line to the terminal device.

4. The image processing apparatus according to claim 1, wherein the control unit causes the display unit to display a message in such a manner that at least part of displayed keys is overlaid with the message when the control unit determines that the terminal device is located far from the image processing apparatus.

5. The image processing apparatus according to claim 1, wherein the control unit causes the display unit to display a message in such a manner that displayed keys are not overlaid with the message when the control unit determines that the terminal device is located close to the image processing apparatus.

6. The image processing apparatus according to claim 5, wherein the message displayed as an icon when the control unit determines that the terminal device is located close to the image processing apparatus.

7. The image processing apparatus according to claim 1, further comprising a capturing device, wherein the control unit, when determining that the terminal device is located far from the image processing apparatus, transmits captured data captured by the capturing device to the terminal device.

8. A method eliminating user confusion when an image processing apparatus is subject to control both locally by an operation unit and remotely by a terminal device via a wireless communication line, the image processing apparatus having a display unit capable of displaying a message, the method comprising;
    a positional relationship acquisition step of acquiring a positional relationship between the terminal device and the image processing apparatus; and
    a display step of displaying a message on the display unit under a predetermined condition,
    wherein when the positional relationship acquisition step determines that the terminal device is located close to the image processing apparatus, disabling at least some operation keys of the operation unit, and in response to a user operating at least one of disabled operation keys causing the display unit to display an error message.

9. The method for processing an image according to claim 8, wherein when the positional relationship acquisition step determines that the terminal device is located close to the image processing apparatus, the display step causes the display unit to display a message smaller than a message displayed when determining that the terminal device is located far from the image processing apparatus.

10. The method for processing an image according to claim 8, wherein the positional relationship acquisition step determines that the terminal device is located close to the image processing apparatus when a wireless local area network line is used as the wireless communication line to the terminal device, and the positional relationship acquisition step determines that the terminal device is located far from the image processing apparatus when a mobile communication line is used as the wireless communication line to the terminal device.

11. The method for processing an image according to claim 8, wherein the display step causes the display unit to display a message in such a manner that at least part of displayed keys is overlaid with the message when the positional relationship acquisition step determines that the terminal device is located far from the image processing apparatus.

12. The method for processing an image according to claim 8, wherein the display step causes the display unit to display a message in such a manner that displayed keys are not overlaid with the message when the display step determines that the terminal device is located close to the image processing apparatus.

13. The method for processing an image according to claim 12, wherein when determining that the terminal device is located close to the image processing apparatus, the message displayed as an icon.

14. The method for processing an image according to claim 8, further comprising a captured data transmit step of transmitting captured data captured by a capturing device of the image processing apparatus to the terminal device when determining that the terminal device is located far from the image processing apparatus.

* * * * *